(12) United States Patent
Van Ostrand et al.

(10) Patent No.: US 7,377,450 B2
(45) Date of Patent: May 27, 2008

(54) CONTROL OF MULTI-ZONE AND MULTI-STAGE HVAC SYSTEM

(75) Inventors: William F. Van Ostrand, Indianapolis, IN (US); Rajendra K. Shah, Indianapolis, IN (US); Laurie L. Werbowsky, Jamesville, NY (US)

(73) Assignee: Carrier Corporation, Syracuse, NY (US)

( * ) Notice: Subject to any disclaimer, the term of this patent is extended or adjusted under 35 U.S.C. 154(b) by 799 days.

(21) Appl. No.: 10/760,664

(22) Filed: Jan. 20, 2004

(65) Prior Publication Data

US 2005/0156049 A1 Jul. 21, 2005

(51) Int. Cl.
G05D 23/00 (2006.01)
F23N 1/00 (2006.01)

(52) U.S. Cl. .................. 236/1 B; 236/1 R; 62/228.5

(58) Field of Classification Search .............. 62/175, 62/228.4, 228.5, 229; 236/1 EA, 1 EB, 1 B, 236/78 D; 165/256
See application file for complete search history.

(56) References Cited

U.S. PATENT DOCUMENTS

| 3,946,297 A | * | 3/1976 | Bechtel ................ 318/609 |
| 5,344,069 A | * | 9/1994 | Narikiyo ............... 236/49.3 |
| 5,829,674 A |   | 11/1998 | Vanostrand |
| 6,540,148 B1 | * | 4/2003 | Salsbury et al. ......... 236/1 EA |

* cited by examiner

Primary Examiner—Chen-Wen Jiang
(74) Attorney, Agent, or Firm—Carlson, Gaskey & Olds

(57) ABSTRACT

A control for controlling a multi-zone HVAC system, wherein the heating or cooling equipment is operable in multiple stages, takes the demand on the system over time into account when determining an appropriate stage. In particular, a time integral of the system demands is utilized along with a current system demand to determine an appropriate stage. In this manner, a weakness in the prior art of allowing a long-term, small difference between the desired set point and the actual temperature in the various zones is addressed.

17 Claims, 1 Drawing Sheet

CONTROL OF MULTI-ZONE AND MULTI-STAGE HVAC SYSTEM

BACKGROUND OF THE INVENTION

This application relates to a control for a heating, ventilation and air conditioning (HVAC) system wherein the control takes in demands from several zones, and determines which of several capacity stages are appropriate given the existing demands. In particular, the present inventive control better meets the demand in that it considers the existence of demand over time in determining whether to change the stage.

HVAC controls are becoming more sophisticated. A basic HVAC control is operable to take in a requested temperature, and compare a requested temperature, or set point, to an actual temperature. The difference is known as the demand. A control then controls the heating or cooling equipment to meet that demand.

More sophisticated systems have several zones, each of which may have an individual demand. As an example, several rooms within a building may each have a set point control that allows a user to select a desired temperature for that particular zone. Each zone may have a sensor to sense the actual temperature. The difference between the desired temperature, or set point, and the actual temperature is known as the zone demand. The demands from the several zones are sent to a control, and the control evaluates how to meet those several demands.

One other feature of modern HVAC systems is that the heating or cooling equipment has several available capacity stages. To ensure the most efficient operation, the control would tend to operate the heating or cooling equipment in the lowest stage that can adequately meet the demand. As the demand increases, then the stage would also increase. Examples of stages might be a furnace provided with several optional heating elements, or an air conditioning system that can be operated in several different capacity modes.

In the prior art, a control for determining the recommended stage looks at a variable known as the system demand. In this prior art control, the system demand is taken from the various zone demands across the system, and calculated utilizing a particular formula. The system demand is considered by a stage control algorithm that selects a desired stage based upon the system demand. The stage control algorithm takes the system demand and multiplies it by some multiplier. The output of this multiplication is a requested stage number. Thus, as the system demand increases, the indicated stage would also increase.

This known control is well suited for low load operations, and when operating at low stages. However, the known control has the potential problem of allowing "droop." Droop occurs when the system is unable to fully meet the demand, but is within a degree or two of the set points. Particularly when operating at a high stage with the known control, a few degrees difference may never be sufficient to move into the next higher stage operation. Thus, the system can operate for long periods of time without ever fully meeting the demand. It would be desirable to provide a stage control algorithm that is better suited for actually meeting the demand.

One simple HVAC system does include a control for determining a recommended stage that looks not only to a current demand, but also to the existence of a demand over time, or the integral of the demand. This control, however, has not been associated with a multiple zone HVAC system. Instead, the known control only provided a control in a single zone system.

SUMMARY OF THE INVENTION

In a disclosed embodiment of this invention, the stage control algorithm for determining a staging demand incorporates a quantity indicative of the amount of demand over time. Stated mathematically, an integral of the demand is considered in the stage control algorithm.

In one embodiment, the staging demand is determined by a stage control algorithm that multiplies the system demand by one multiplier, and takes the cumulative sum of system demands over some period of time and multiplies that sum by another multiplier. With this stage control algorithm, the problem of droop is avoided in that a demand existing over a period of time, provides sufficient weighting to move the staging demand to higher stages.

One other feature that is modified by this invention from the prior art control is the way the system demand is calculated. The prior art system demand took the totality of system demands across the zone, and further the highest positive demand for any one zone and utilized the formula to calculate the system demand. Since the present invention is utilizing the integral of the system demands over time, there is the possibility of both positive and negative system demands. Thus, the present invention utilizes a system demand formula which weights the greatest absolute value zone demand.

Further, while in the disclosed embodiment, the consolidation of the several zone demands occurs prior to taking the integral, it is also possible that the integral is taken on the individual zone demands, with the current and integral signals for each zone then being consolidated. However, applicant believes this may be the more challenging approach, and thus utilizes the consolidated signal as the term that is used in the integral calculation in the disclosed embodiment.

These and other features of the present invention can be best understood from the following specification and drawings, the following of which is a brief description.

DETAILED DESCRIPTION OF THE PREFERRED EMBODIMENT

Figure 1:
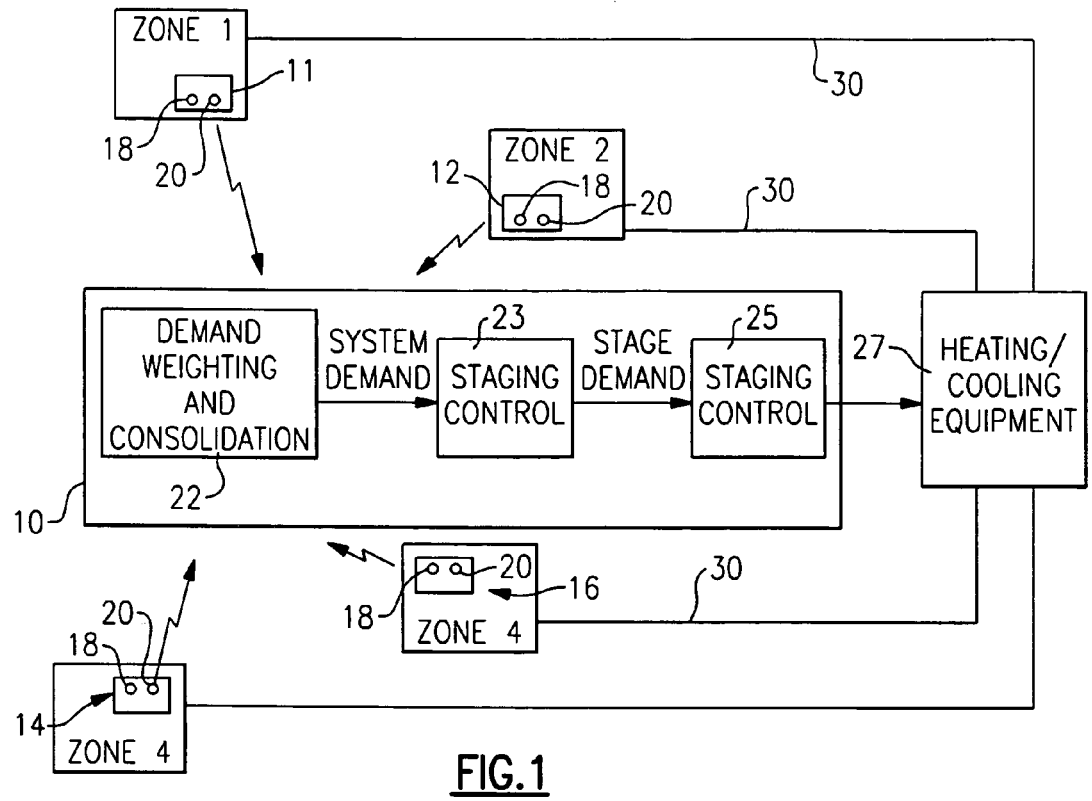
FIG. 1 schematically shows a control for an HVAC system.

An HVAC system control 10 is illustrated in FIG. 1. Controls for four zones are shown as 11, 12, 14 and 16. Each of the zone controls 11, 12, 14, 16 has a sensor 18 for sensing actual temperature and a control 20 allowing a user to input a desired or set temperature for that zone. Each of the zone controls 11, 12, 14 and 16 then send a signal, or signals, to the control 10. Control 10 is illustrated incorporating logic steps, including the demand weighting and consolidation control step 22. The control 10 may be a microprocessor, although other types of appropriate controls may be utilized. Signals from the zones are sent to control 10 to provide an indication of the difference between the set point and actual temperature. This difference is known as the zone demand.

When the system is "on" or conditioning air, the zones that are incorporated into the control include all zones with a damper that is at least partially open. When the system is in an "off" mode, or not conditioning air, then all zones having a demand are utilized in this calculation.

At step 22, the zone demands are consolidated into a system demand. In the prior art, system demand was taken from the demands from the zone, with a weighted increase for the greatest positive zone demand. A "positive" zone demand would be where the actual temperature is below the set point in heating mode, or wherein the actual temperature is above the set point in a cooling mode. The formula used was as follows:

$$\text{System Demand} = [(\text{the sum of demands from zones which have demand})/(\text{the number of zones having demand}) + (\text{the greatest zone demand})]/2.$$

This system demand is then sent to a control step 23 for determining the stages requested, or the staging demand.

The stage control algorithm for determining staging demand in the prior art simply applies a multiplier to the system demand. The actual prior art control utilizes a multiplier of 2, with a hysteresis of one stage. The result is that a first stage of equipment is turned on with 0.5 degree weighted average error and turned off when the weighted average error is zero.

Figure 2:
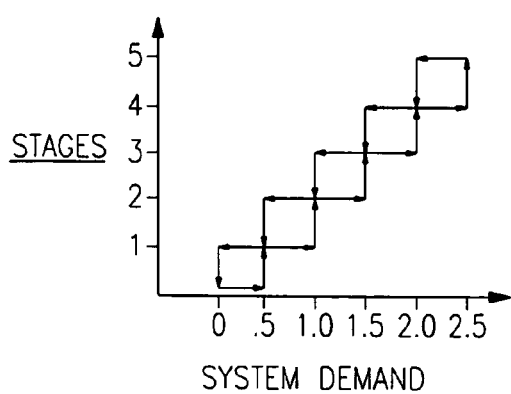
FIG. 2 shows the effect of the prior art control algorithm.

As shown in FIG. 2, an increasing amount of system demand is thus required to result in a greater staging demand, as the stages increase. In order to turn on the fifth stage, a relatively large average error of 2.5 degrees is needed. Thus, if the system is operating in fourth stage, there could be an average error of 2 degrees, as an example, that could exist for long periods of time. This was a deficiency in the prior art as mentioned above.

The present invention addresses this problem by considering system demands over time in determining a staging demand.

In one embodiment, the staging demand is determined as follows:

$$\text{Staging Demand} = 2(\text{Current System Demand}) + (1/24)(\text{the cumulative sum of System Demands calculated once per minute starting when the equipment was last turned on.})$$

Since there would be 60 of the system demands taken into the cumulative sum number per hour, the total multiplier is effectively 2.5 of the average system demand over that time.

Figure 3:
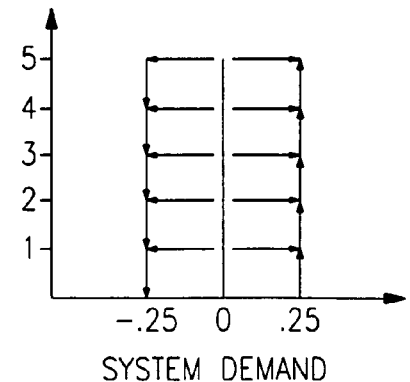
FIG. 3 schematically shows the staging increase with the inventive control algorithm.

Of course, other multipliers can be utilized, and other time periods, both longer or shorter, can be utilized in the integral portion. As shown in FIG. 3, the present invention is able to move up to as high as a fifth stage (or even more) with relatively small system demands (e.g., 0.25 degrees). Thus, the present inventive control will not continue to operate for long periods of time with the average zone demand being a few degrees away from the desired set point, no matter the "current" stage of operation.

With the use of an integral term, over-conditioning should allow the integral term to move negatively. Since the prior art control only turned the equipment on to a higher stage when a sufficiently large demand existed, and turned it off when the demand went to zero, a negative demand was not a problem. However, when the integral term is used, the system demand must average to zero (so that the integral term will be constant), to keep the staging demand constant. This means the system demand should be allowed to become either positive or negative. The prior art system demand, which weighted the zone with the greatest positive zone demand, is no longer best suited for this control.

The prior art system demand formula was calculated as follows:

$$\text{System Demand} = [(\text{the sum of demands from zones which have demand})/(\text{the number of zones having demand}) + (\text{the greatest positive zone demand})]/2.$$

As the system moves towards a stage down point, the "greatest positive zone demand" is most likely a small positive demand whereas a much larger negative demand would exist elsewhere. Yet, in the prior art formula, the small positive demand was the most heavily weighted.

With the present invention, the system demand is changed to the following:

$$\text{System Demand} = [(\text{the sum of demands from zones which have demand})/(\text{the number of zones having demand}) + \{\text{the greatest zone demand}\}]/2.$$

The quantity in the { } is intended to mean the zone demand which has the largest absolute value. Thus, as the system approaches turn off, the output of the above equation snaps negatively when the largest negative zone demand just exceeds the largest positive zone demand. When passed through the staging calculation, the first (proportional) term of the staging demand would also cause the staging signal to snap negatively. Thus, staging down normally occurs when the largest positive zone demand just equals that of the most over-conditioned zone, or the largest negative zone demand.

As shown in FIG. 1, there is a staging control step 25 to control heating/cooling equipment 27. As also shown schematically in FIG. 1, ducts 30 lead from the heating or cooling element to send air to the various zones in an attempt to meet the set points. The staging control steps include several controls for controlling changes in the staging. This staging control can be generally as known in the art, and may include several timers. A cycle timer may prevent the same stage from turning on within a period of time (e.g., 15 minutes) from the last time it was turned on. This is intended to limit cycling between the same two stages to four times per hour to prevent excessive equipment cycling. During the time the staging timer is preventing staging up, the integral term is not updated in the inventive stage control algorithm. This is intended to prevent any "integrator wind-up" which is a potential problem with PI controls.

Further, a staging timer of 10 minutes normally prevents staging up at a rate of more than 10 minutes per stage, regardless of the number of stages requested. This prevents excessive staging when a set point is initially changed. Also, a minimum on-timer of three minutes ensures that once a stage is turned on, it will remain on for at least three minutes.

The present invention, as disclosed, is able to better deal with eliminating long-term zone demands, and ensure that the actual proper stage is achieved. The present invention is thus able to operate at high loads, while still accurately achieving the set points.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A control for an HVAC system comprising:
a central control for receiving a plurality of zone control signals providing information on a desired temperature and an actual temperature for each of a plurality of zones; and
said central control utilizing a current one of said zone control signals and at least a prior one of said zone control signals to determine a desired staging demand for an associated HVAC system.

2. The control as set forth in claim 1, wherein said zone control signals are utilized to calculate a system demand, and said prior zone control signals are utilized from prior system demands, with said central control utilizing current and prior ones of said system demands to determine said desired staging demand.

3. The control as set forth in claim 2, wherein said staging demand is determined by the following formula:

Staging Demand=$x$(System Demand)+$y$(the sum of a plurality of prior System Demands taken over time)

wherein x and y are positive constants.

4. The control as set forth in claim 2, wherein said system demand is calculated by weighting the zone having the greatest absolute value of difference between its set point and its actual temperature.

5. The control as set forth in claim 4, wherein said system demand is calculated by the following formula:

$$\text{System Demand} = [(\text{the sum of demands from zones which have demand})/(\text{the number of zones having demand}) + \{\text{the greatest zone demand}\}]/2$$

wherein the { } symbols indicate the demand of the zone having the greatest absolute value of demand.

6. The control as set forth in claim 1, wherein said prior zone control signals are taken over a plurality of time periods prior to a point at which said staging demand is determined.

7. The control as set forth in claim 6, wherein a first multiplier is multiplied by said current zone control signals, and a second multiplier is multiplied by a sum of said prior zonecontrol signals taken over a period of time, with said first and second multipliers being different numbers.

8. A method of operating an HVAC system comprising the steps of:
(1) providing a zone control in each of a plurality of zones, each said zone control allowing the setting of a zone set point, and each including a sensor for sensing an actual zone temperature, and sending signals to a central control indicative of the zone set point and the actual zone temperature;
(2) determining a zone demand for each zone in said central control based upon said zone set point, and said actual zone temperature; and
(3) determining a desired stage for an associated HVAC system, said determination being based upon a current value of said zone demand, and prior values of said zone demands.

9. The method as set forth in claim 8, wherein said zone demands are utilized to calculate a system demand based upon said plurality of zone demands.

10. An HVAC system comprising:
an HVAC component for changing the temperature of air in an environment;
ducting to provide air to a plurality of distinct zones from said HVAC component;
a plurality of zone controls each allowing the setting of a zone set point, and each determining an actual zone temperature, said zone controls sending signals to a central control; and
said central control utilizing current ones of said zone control signals, and at least a prior one of said zone control signals to determine a desired staging demand for said HVAC component.

11. The system as set forth in claim 10, wherein said zone control signals are utilized to calculate a system demand, and said prior zone control signals are utilized from prior system demands, with said central control utilizing current and prior ones of said system demands to determine said desired staging demand.

12. The system as set forth in claim 11, wherein said staging demand is determined by the following formula:

Staging Demand=$x$(System Demand)+$y$(the sum of a plurality of prior System Demands taken over time)

wherein x and y are positive constants.

13. The system as set forth in claim 11, wherein said system demand is calculated by weighting the zone having the greatest absolute value of difference between its set point and its actual temperature.

14. The system as set forth in claim 13, wherein said system demand is calculated by the following formula:

System Demand=[(the sum of demands from zones which have demand)/(the number of zones having demand)+{the greatest zone demand}]/2 wherein the { } symbols indicate the demand of the zone having the greatest absolute value of demand.

15. The system as set forth in claim 11, wherein said prior system zone control signals are taken over a plurality of time periods prior to a point at which said staging demand is determined.

16. The system as set forth in claim 15, wherein a first multiplier is multiplied by said current ones of said zone control signals, and a second multiplier is multiplied by a sum of said prior zone control signals taken over a period of time, with said first and second multipliers being different numbers.

17. The system as set forth in claim 16, wherein said zone control signals from each of said plurality of zones are taken together to determine a system demand, and said system demands are utilized by said central control as said current and prior zone control signals.

* * * * *

UNITED STATES PATENT AND TRADEMARK OFFICE
CERTIFICATE OF CORRECTION

PATENT NO. : 7,377,450 B2
APPLICATION NO. : 10/760664
DATED : May 27, 2008
INVENTOR(S) : Van Ostrand et al.

It is certified that error appears in the above-identified patent and that said Letters Patent is hereby corrected as shown below:

Claim 7, Column 5, line 54: "zonecontrol" should read as --zone control--

Signed and Sealed this

Twelfth Day of August, 2008

JON W. DUDAS
*Director of the United States Patent and Trademark Office*